(12) United States Patent
Haverfield et al.

(10) Patent No.: US 7,544,037 B2
(45) Date of Patent: Jun. 9, 2009

(54) PALLET CLAMPING DEVICE

(75) Inventors: Forrest A. Haverfield, Maplewood, OH (US); Patrick A. Soder, Sidney, OH (US); Douglas W. Meyers, Troy, OH (US); Michael A. Heitkamp, New Bremen, OH (US)

(73) Assignee: Crown Equipment Corporation, New Bremen, OH (US)

( * ) Notice: Subject to any disclaimer, the term of this patent is extended or adjusted under 35 U.S.C. 154(b) by 439 days.

(21) Appl. No.: 11/485,207

(22) Filed: Jul. 12, 2006

(65) Prior Publication Data

US 2007/0014654 A1    Jan. 18, 2007

Related U.S. Application Data

(60) Provisional application No. 60/698,856, filed on Jul. 13, 2005.

(51) Int. Cl.
*B66F 9/18* (2006.01)
(52) U.S. Cl. ............... 414/785; 294/110.1; 414/622
(58) Field of Classification Search ............. 294/110.1, 294/116; 414/622, 785
See application file for complete search history.

(56) References Cited

U.S. PATENT DOCUMENTS

| | | | |
|---|---|---|---|
| 546,217 A * | 9/1895 | Armstrong | 24/134 R |
| 1,440,285 A | 12/1922 | Engstrom et al. | |
| 1,938,485 A * | 12/1933 | Cossor | 294/106 |
| 2,215,844 A * | 9/1940 | Van Syckle | 294/110.1 |
| 2,256,454 A | 9/1941 | Bomar | |
| 2,352,017 A | 6/1944 | Scharpenberg et al. | |
| 2,644,253 A | 7/1953 | Salido | |
| 2,743,954 A * | 5/1956 | Ostlund | 294/113 |
| 2,745,695 A * | 5/1956 | Peyer | 294/118 |

(Continued)

FOREIGN PATENT DOCUMENTS

EP    1 627 847 A1    1/2006

(Continued)

OTHER PUBLICATIONS

Photograph of Hyster lift truck including a pallet clamp; available at least as early as Mar. 25, 2004.

(Continued)

*Primary Examiner*—James Keenan
(74) *Attorney, Agent, or Firm*—Stevens & Showalter LLP

(57) ABSTRACT

A pallet clamping device is mounted between forks of a material handling vehicle. The device clamps to a stringer of a pallet using a pair of horizontally moveable jaws. The jaws are resiliently forced toward one another for clamping a stringer so that a clamped pallet will not move off the forks. The jaws are mounted for pivoting and sliding motion relative to mounting pins which, together with links coupling the jaws to a base of the device, tighten jaw closure if a pallet moves away from the forks. The pivoting and sliding motion of the jaws helps align the jaws with pallets not perfectly aligned with the vehicle. Depression of a foot pedal moves the jaws from a closed position to a latched open position for receiving a pallet stringer. The jaws can also be moved to an unlatched open position for receiving a greater width center stringer. Upon release of the operating device from the unlatched open position, the jaws move toward their closed position.

24 Claims, 18 Drawing Sheets

U.S. PATENT DOCUMENTS

| | | | |
|---|---|---|---|
| 2,911,251 A * | 11/1959 | Osborn | 294/110.1 |
| 3,013,517 A * | 12/1961 | Isham | 294/19.1 |
| 3,207,548 A | 9/1965 | Moskopf et al. | |
| 3,425,732 A | 2/1969 | Reich | |
| 3,493,137 A * | 2/1970 | Nilsen et al. | 414/608 |
| 3,593,672 A | 7/1971 | Breen | |
| 3,750,311 A | 8/1973 | Anderson | |
| 3,797,687 A * | 3/1974 | Silva | 414/607 |
| 3,807,786 A * | 4/1974 | Alegria | 294/104 |
| 4,261,609 A | 4/1981 | Kraszewski et al. | |
| 4,381,582 A | 5/1983 | Korhonen | |
| 4,522,439 A | 6/1985 | Haney | |
| 4,538,953 A | 9/1985 | Abramson, Jr. | |
| 4,605,255 A | 8/1986 | Olson | |
| 4,650,236 A | 3/1987 | Haney et al. | |
| 4,685,854 A | 8/1987 | Bulle | |
| 4,714,399 A | 12/1987 | Olson | |
| 4,716,811 A | 1/1988 | Johnson | |
| 4,726,729 A | 2/1988 | Olson et al. | |
| 4,728,137 A | 3/1988 | Hamed et al. | |
| 4,929,012 A | 5/1990 | Slezak | |
| 5,026,245 A | 6/1991 | Sabo | |
| 5,033,933 A | 7/1991 | Sinclair et al. | |
| 5,073,080 A | 12/1991 | Blum | |
| 5,082,413 A | 1/1992 | Grosz et al. | |
| 5,244,338 A | 9/1993 | White | |
| 5,277,689 A | 1/1994 | Ruetschle et al. | |
| 5,346,270 A | 9/1994 | Kuse | |
| 5,693,113 A | 12/1997 | Dries et al. | |
| 5,709,120 A | 1/1998 | Shilling | |
| 5,960,689 A | 10/1999 | Warren | |
| 6,015,255 A | 1/2000 | Vander Meer | |
| 6,318,949 B1 | 11/2001 | Seaberg | |
| 6,390,751 B2 | 5/2002 | Jordan et al. | |
| 6,519,880 B2 | 2/2003 | Robitaille | |
| 6,695,372 B2 | 2/2004 | Parker | |
| 6,695,553 B1 | 2/2004 | Galbreath et al. | |
| 6,767,175 B2 | 7/2004 | Fujita et al. | |
| 7,448,842 B2 * | 11/2008 | Schonauer | 414/785 |
| 2003/0156926 A1 | 8/2003 | Coblentz | |
| 2003/0156934 A1 | 8/2003 | Fujita et al. | |
| 2003/0197391 A1 | 10/2003 | Graffin | |
| 2003/0233963 A1 | 12/2003 | Fan | |
| 2004/0066049 A1 | 4/2004 | Azrikam | |
| 2008/0107511 A1 * | 5/2008 | Oberg | 414/445 |

FOREIGN PATENT DOCUMENTS

JP        09012292        1/1997

OTHER PUBLICATIONS

Photograph of Raymond lift truck including a pallet clamp; available at least as early as Mar. 25, 2004.

* cited by examiner

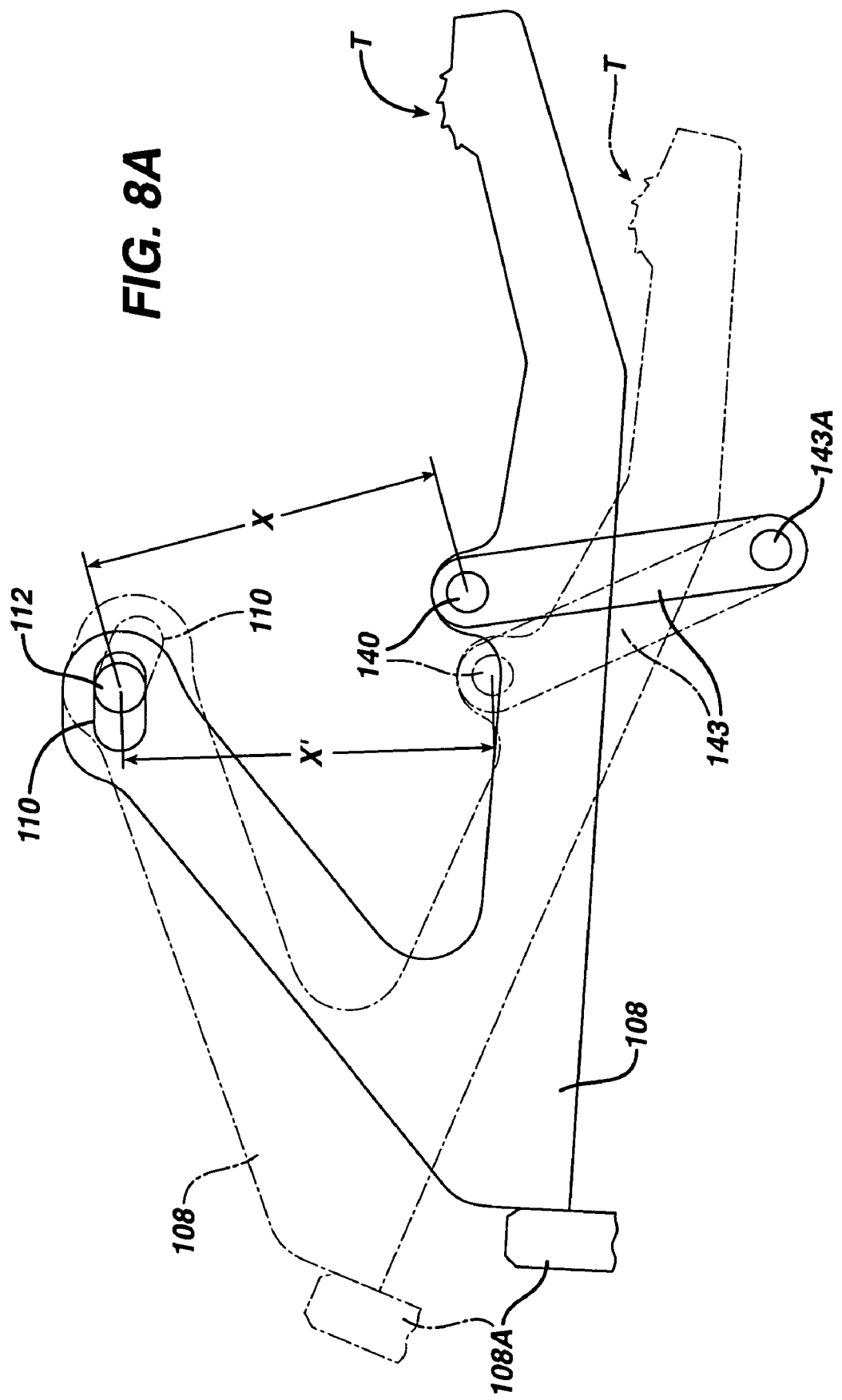

PALLET CLAMPING DEVICE

CROSS-REFERENCE TO RELATED APPLICATION

This application claims the benefit of U.S. Provisional Application No. 60/698,856, filed Jul. 13, 2005, which is incorporated herein by reference.

BACKGROUND OF THE INVENTION

The present invention relates in general to material handling vehicles and, more particularly, to a pallet clamping device associated with forks of such vehicles for selectively clamping or grabbing a center rib or stringer of a pallet supported by the forks so that the pallet is effectively locked to the forks and cannot move off the forks.

A variety of pallet clamps and other pallet locking devices are known in the prior art. In U.S. Pat. No. 2,256,454, a lift truck includes a load pushing frame mounted above its forks and a pair of pallet grippers. Both the grippers and the load pushing frame are actuated to push a piled load of bags off a pallet upon which the load is stacked while the grippers engage a center rib of the pallet to retain the pallet on the truck as the load is pushed off the pallet. The pallet grippers, best shown in FIGS. 3 and 4, include a pair of grab hooks that are activated by cam plates and a spread fork by operation of a solenoid or by a double acting hydraulic cylinder. The grab hooks engage hook bars added to the center rib of pallets being used with the truck. An alternate pallet gripper, shown in FIG. 7, includes a lug integral with a fork and a socket formed in the underside of the top surface of a pallet being used with the truck.

Another currently popular form of pallet clamping device includes passive locking clamps wherein either single cam action forces or double cam action forces resulting from movement of a pallet off the forks wedge the cam or cams into a center rib or stringer of the pallet to prevent the pallet from moving off the forks. The structure and operation of such a pallet clamp is illustrated in FIGS. 1-4 wherein a foot pedal 10 controls extension of a cable 12 to move wedge cams 14 to an open position against the force of torsion springs 16 mounted to move the wedge cams 14 toward a closed position. As shown in FIGS. 2-4, the wedge cams 14 accommodate a variety of widths of center ribs or stringers 17 as a pallet is engaged. Once a stringer has been moved into the wedge cams 14, into which they can freely move, its exit is blocked by the cam action of the wedge cams 14 to firmly grip the stringer.

Yet another form of pallet clamping device is disclosed in U.S. Pat. No. 6,767,175 wherein lock bars positioned between forks of an order picking truck have tapered portions positioned on upper faces of a top end of the lock bars as shown in FIGS. 3-5. When the forks are inserted into a pallet, if the tapered portions come into contact with an end face of an upper deck board of the pallet, the lock bars rotate downward. If not, the lock bars rotate downward upon lifting of the pallet. When a landing sensor is activated by a magnet, see FIGS. 3 and 7a-7d, the lock bars are immediately driven and the locking operation is started. The ends of the lock bars push or come into pressure contact with an upper face of a lower deck board of the pallet, and the pallet is locked. A damper provides a resilient force to ensure that the lock bars remain engaged in spite of oscillations due to movement of the truck.

While known pallet clamping devices each have their own advantages and disadvantages, there is an ongoing need to advance the state of the art and provide new pallet clamping devices that offer alternates to existing designs and produce clamping characteristics that facilitate material handling operations performed by trucks equipped with the new clamping devices.

SUMMARY OF THE INVENTION

This need is currently met by a pallet clamping device mounted between forks of a material handling vehicle for grabbing a center stringer of a pallet to be moved using the vehicle. The pallet clamping device comprises a pair of horizontally moveable jaws having a closed position wherein the jaws are resiliently forced toward one another for engagement with a stringer to grab the stringer and thereby clamp the corresponding pallet to the forks. The jaws are pivotally mounted and linked to a clamp base so that attempted movement of a clamped pallet off the forks results in tighter closure of the jaws onto the stringer. An operating device, a foot pedal and associated linkages as illustrated, moves the jaws from their closed position to a latched first open position wherein the jaws are separated by a first distance for receiving a center stringer sized up to the first distance and to an unlatched second open position wherein the jaws are separated by a second distance greater than the first distance, wherein the jaws can receive a center stringer sized up to the second distance and wherein, upon release of the operating device from the unlatched second position, the jaws move to their closed position. By mounting the jaws by means of pinned slots so that the jaws pivot about and slide along the pins, alignment of the jaws with a pallet and hence entrance of the pallet clamp into a pallet is facilitated. The operating device may comprise a foot pedal movable between a fully up position and a fully depressed position with the foot pedal being spring biased to its fully up position.

In accordance with one aspect of the present invention a material handling vehicle comprises a pair of forks to be inserted into a pallet having a center stringer and a hoisting device for raising the forks. A pallet clamp device is mounted between the forks, the pallet clamp device including a pair of jaws having a closed position wherein the jaws are resiliently forced toward one another for engagement with the center stringer. An operating device is provided for moving the jaws from their closed position to a latched open position wherein the jaws are separated by a first distance and to an unlatched open position wherein the jaws are separated by a second distance greater than the first distance.

In accordance with another aspect of the present invention a material handling vehicle comprises a pair of forks to be inserted into a pallet having a center stringer and a hoisting device for raising the forks. A pallet clamp device is mounted between the forks, the pallet clamp device including a pair of jaws having a closed position wherein the jaws are resiliently forced toward one another for engagement with the center stringer. Pivot pins are provided for mounting the jaws for pivoting and sliding movement about the pins as the jaws move between the closed and open positions for receiving the center stringer.

The operating device may comprise a foot pedal movable between a fully up position and a fully depressed position. When a foot pedal is used, the foot pedal may be spring biased to its fully up position. The foot pedal may be held in a partially depressed position, corresponding to a jaws latched open position between the fully up position and the fully depressed position, when the jaws are in the latched open position.

BRIEF DESCRIPTION OF THE DRAWINGS

FIG. 8A is a top plan view of the second jaw illustrating pivoting and sliding movement of the second jaw about a pin and a link pivotally mounted to a clamp base for operating the second jaw;

DETAILED DESCRIPTION OF THE INVENTION

Figure 7:
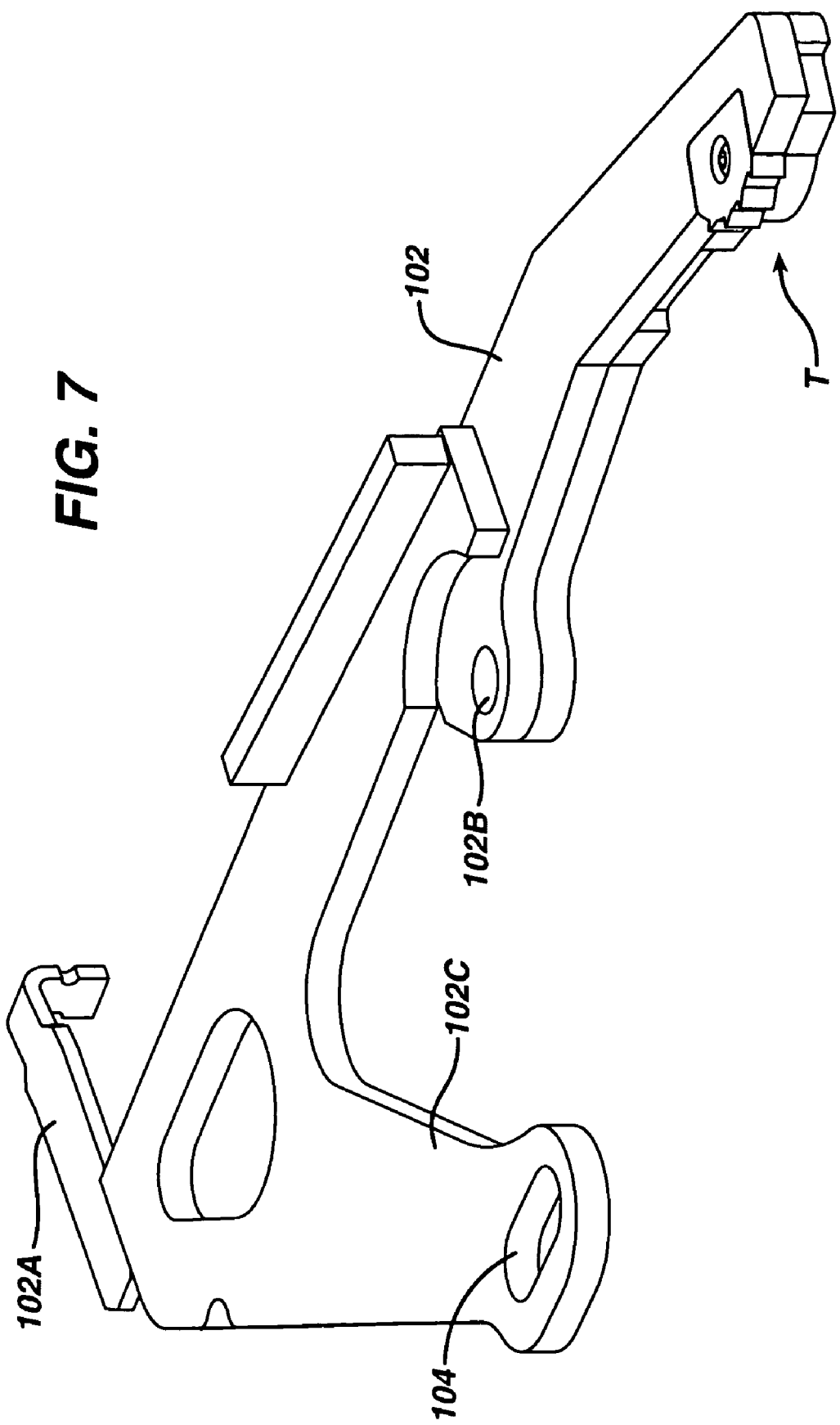
FIGS. 7 and 8 are isometric views of the first jaw and the second jaw, respectively, of the pallet clamping device of FIGS. 5 and 6.
Figure 8:
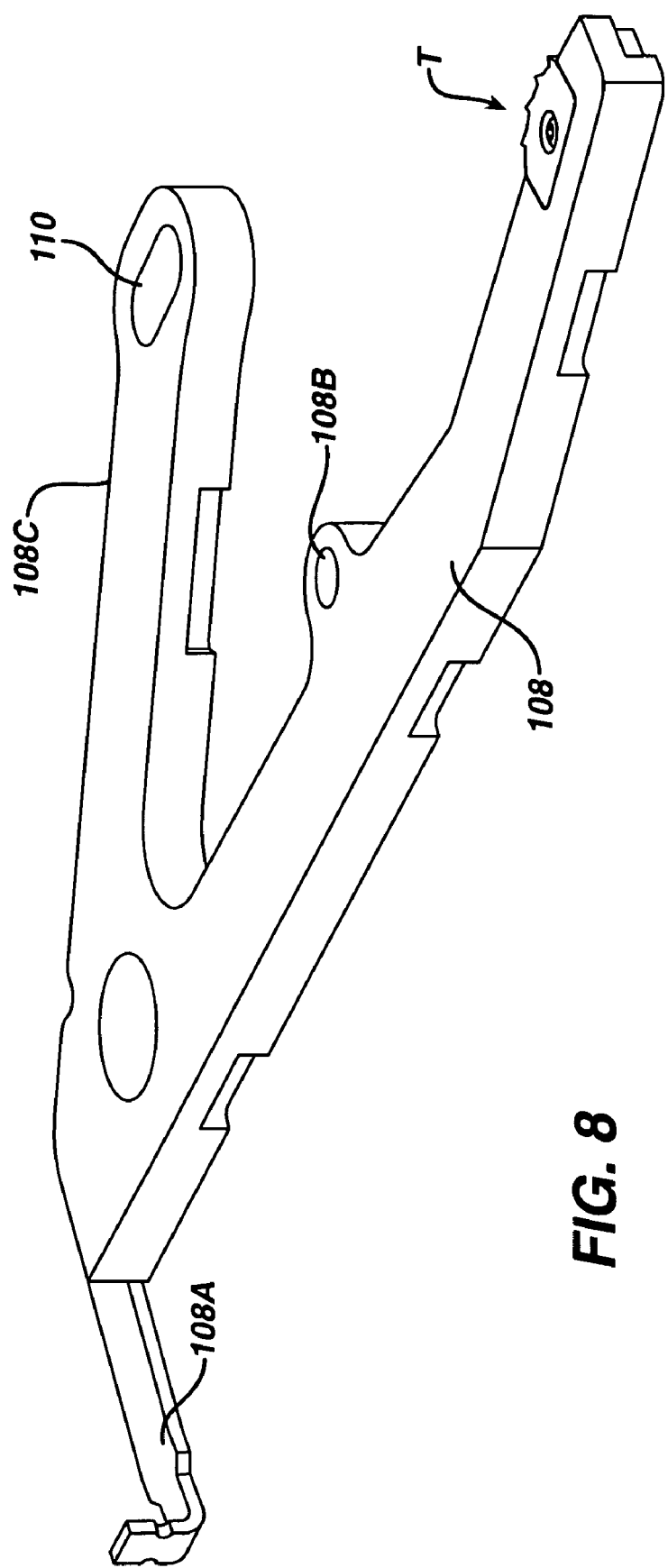
Figure 9:
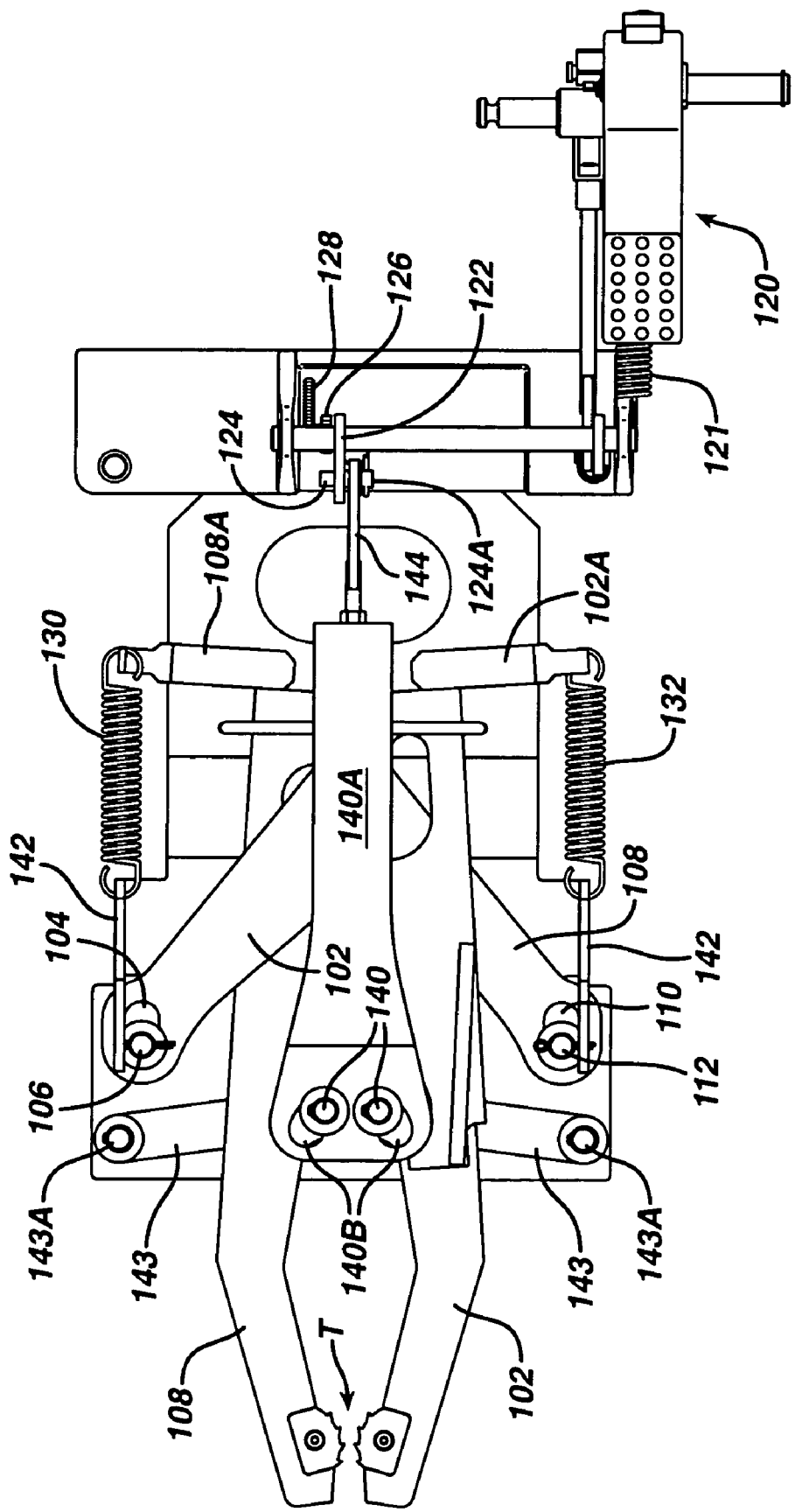
FIG. 9 is a top plan view of the pallet clamping device of FIGS. 5 and 6 with the jaws closed.
Figure 16:
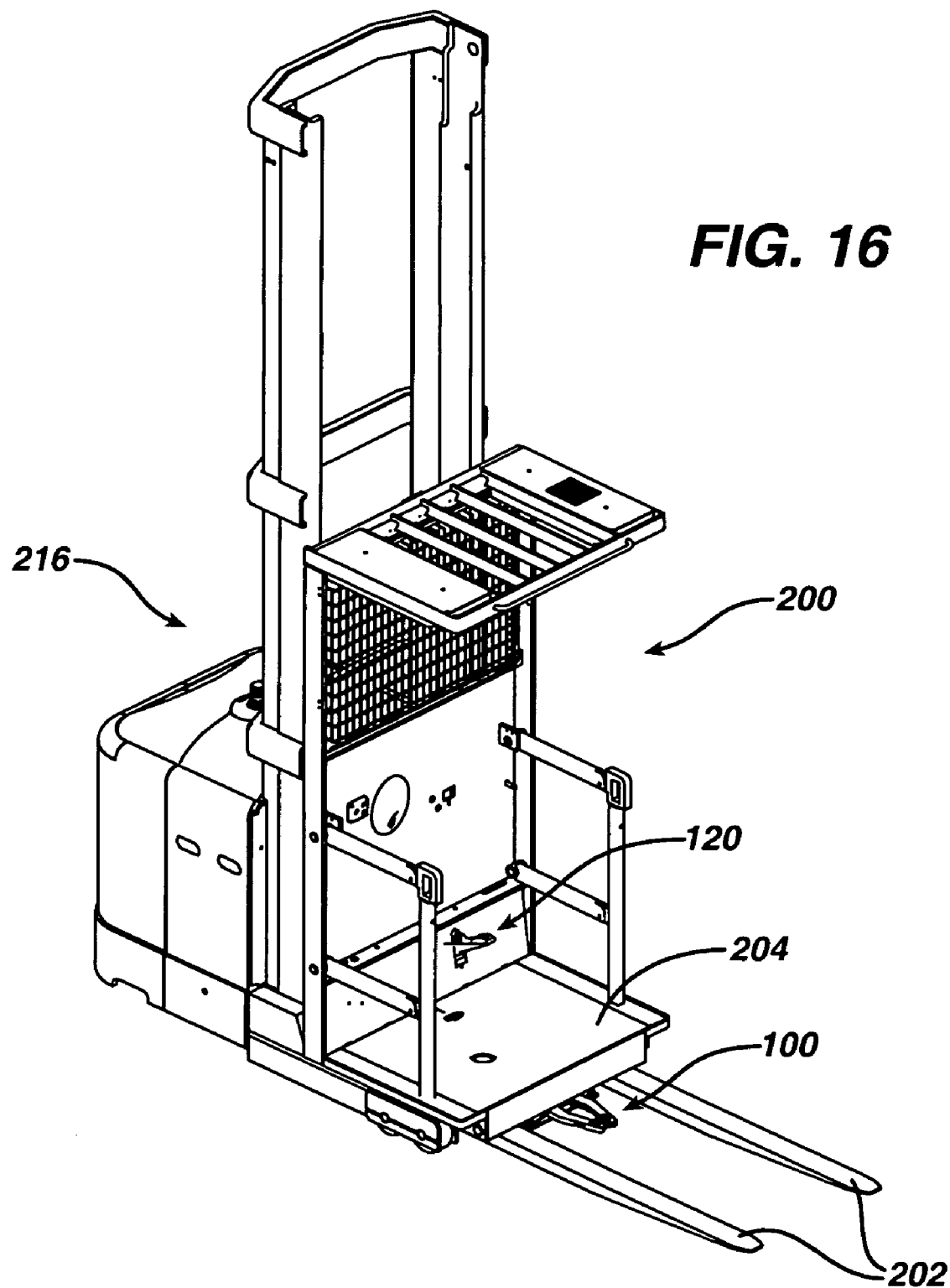
FIG. 16 is a perspective view of a material handling vehicle including an illustrative embodiment of the pallet clamping device of the present invention.
Figure 17:
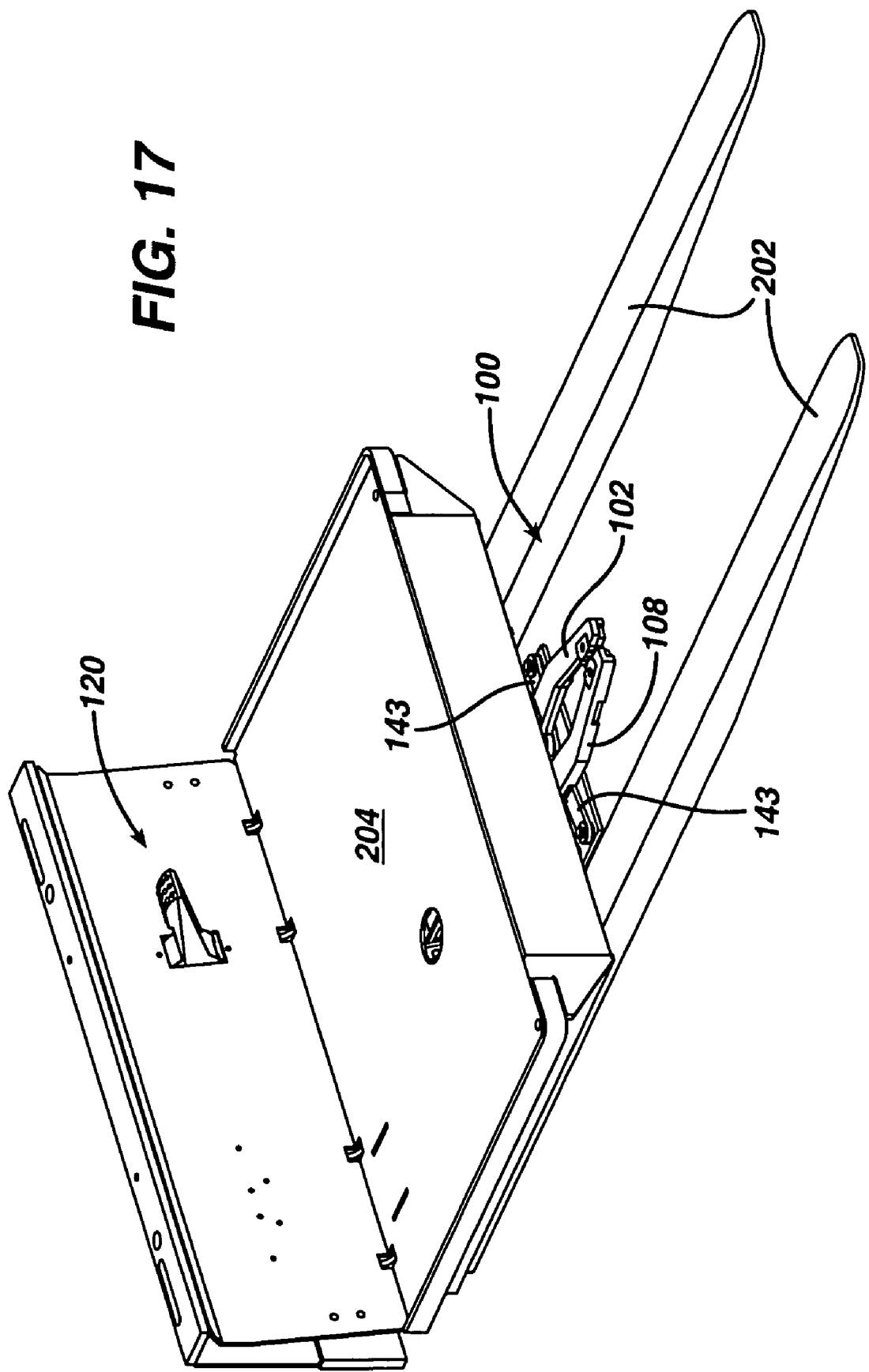
FIG. 17 is a perspective top view of the forks and a portion of an operator's platform of FIG. 16 to which the pallet clamping device of the present invention is mounted.
Figure 17A:
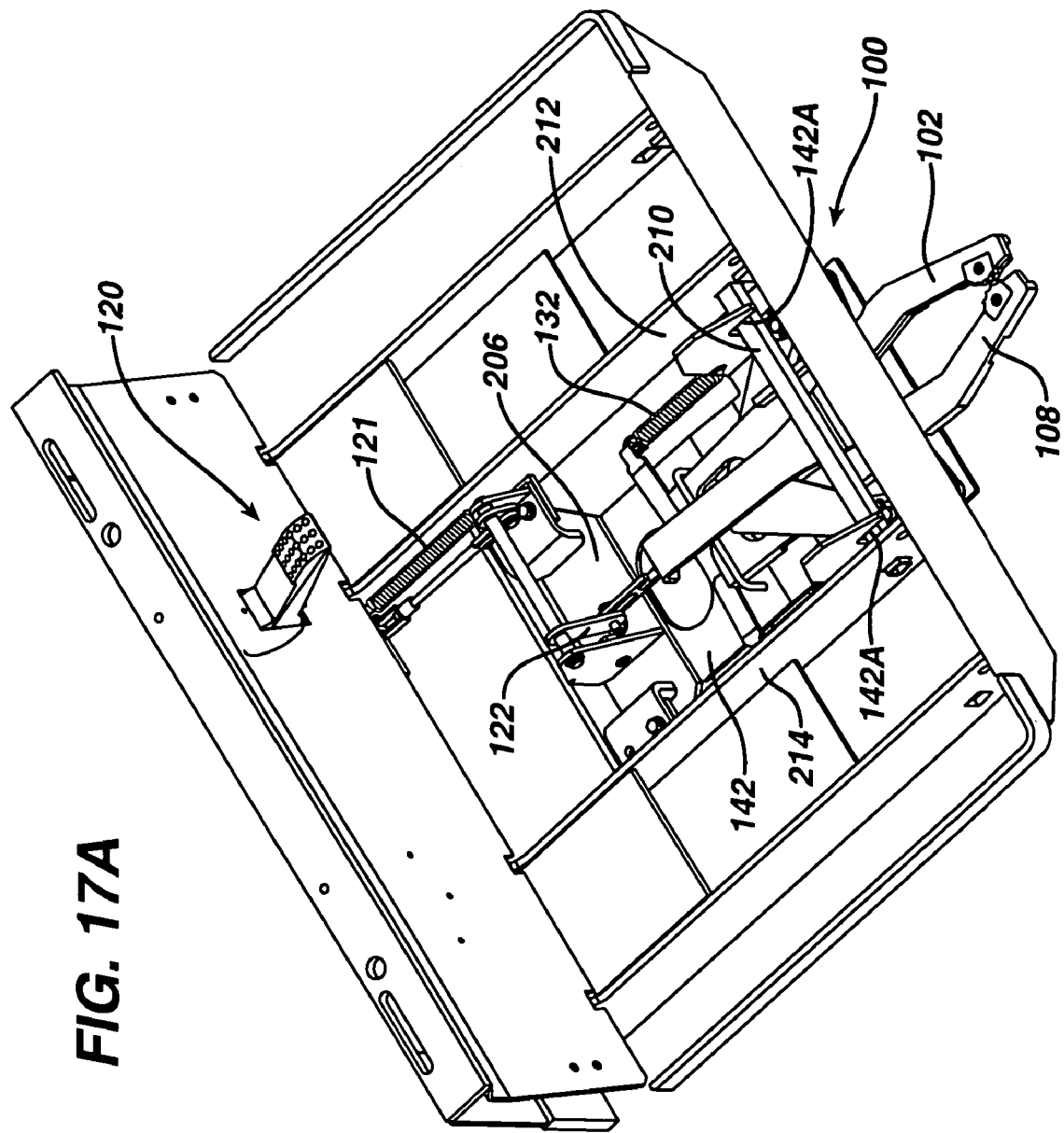
FIG. 17A is a perspective top view of the portion of the operator's platform shown in FIG. 17 with the floor cover removed to reveal the mounting of the pallet clamping device of the present invention.
Figure 18:
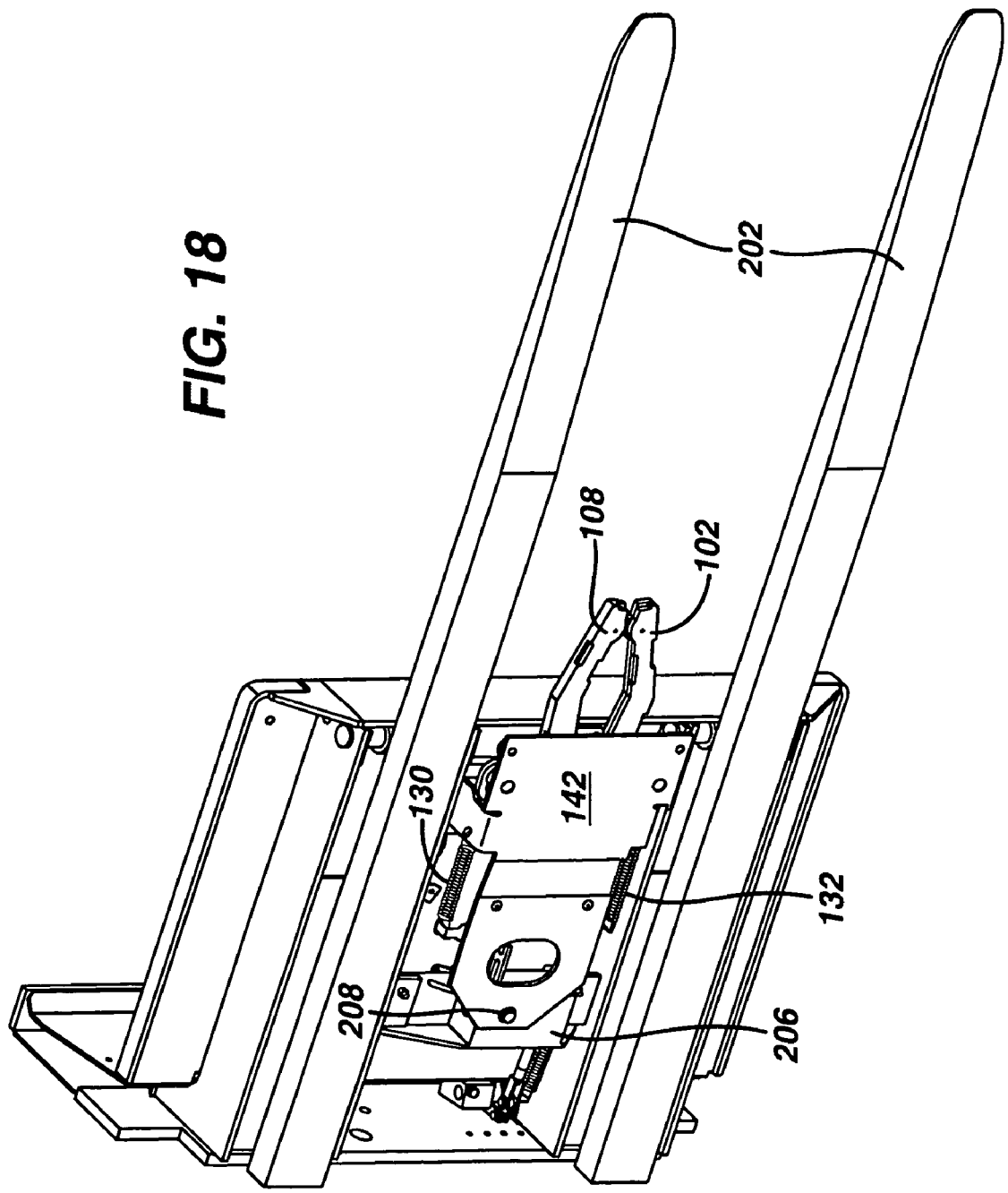
FIG. 18 is a perspective bottom view of the forks and a portion of an operator's platform to which the pallet clamping device of the present invention is mounted.

The pallet clamping device of the present application will now be described with reference to drawing FIGS. 5-18 which illustrate a currently preferred structure of a pallet clamp 100 that is fitted between forks 202 of a material handling vehicle 200, with the vehicle 200 including a hoisting device 216 for raising the forks 202 being shown in FIG. 16. The pallet clamp 100 includes a first jaw 102, best shown in FIG. 7, including a laterally extending jaw portion 102C having a slot 104 that receives a pivot pin 106 so that the first jaw 102 is mounted for pivoting about and sliding along the pin 106. A second jaw 108, best shown in FIGS. 8 and 8A, also includes a laterally extending jaw portion 108C having a slot 110 that receives a pivot pin 112 so that the second jaw 108 is mounted for pivoting about and sliding along the pin 112. The pivoting and sliding motion of the jaws 102, 108 facilitates engagement of the pallet clamp with pallet stringers when the jaws 102, 108 and forks 202 of the vehicle 200 are not perfectly square with a pallet. The jaws 102, 108 can be operated to clamp onto pallet stringers ranging in width from approximately 1 inch to approximately 7 inches for a working embodiment, however, the size of the pallet clamping device 100 of the present application can be changed as well as the angles of the slots 104, 110 to accommodate other pallet stringer size ranges as required. Also, changes in the illustrated shape of the jaws 102, 108, for example to reduce the weight of the jaws 102, 108, are contemplated for the pallet clamp 100.

An operating device, taking the form of a foot pedal 120 in the illustrated embodiment, is depressed to open the jaws 102, 108 with depression of the pedal 120 being opposed by a pedal reset spring 121. When the pedal 120 is depressed, a linkage 140A ultimately pulls on couplings comprising pins 140 which extend through arcuate slots 140B of the linkage 140A and also through holes 102B and 108B, see FIGS. 7 and 8, of the jaws 102, 108. The pins 140 are fixedly connected, such as by welding, to pivot links 143 which are in turn pivotally mounted to pins 143A which are fixedly mounted, such as by welding, to and extend from a support frame 142 for the pallet clamp 100. When the linkage 140A pulls on the pins 140, the pivot links 143 swing apart and as they do, the jaws 102, 108 are forced to pivot about the pins 106, 112, respectively, and slide in the slots 104, 110, respectively. In the illustrated embodiment, the pivoting of the jaws 102, 108 about the pins 106, 112 magnifies their movement so that the teeth T defining gripping surfaces on the jaws 102, 108 spread apart a greater amount than the pins 140 spread apart within the slots 140B. For example, in one embodiment of the invention, the teeth T defining gripping surfaces on the jaws 102, 108 may spread apart approximately fifteen (15) times as much as the pins 140 spread apart within the slots 140B. The slots 104, 110 allow for the change in distance between the pins 140 and the pins 106, 112 as the pins 140 swing through their respective arcs in the slots 140B, see FIG. 8A.

Figure 10:
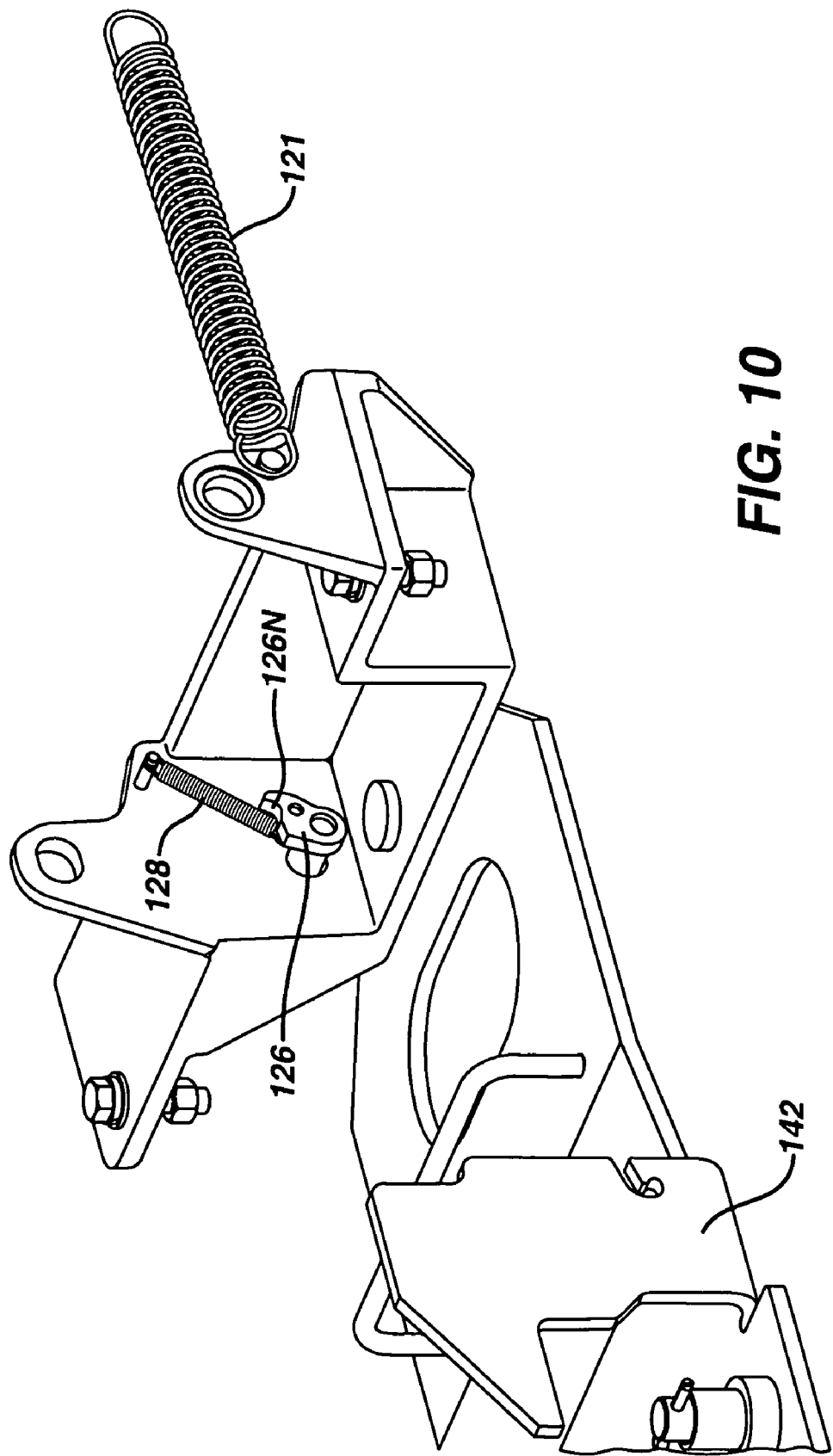
FIG. 10 is an isometric view of a portion of the pallet clamping device of FIGS. 5 and 6 showing a pivoting latch which operates with a link pin to hold the jaws in a latched open position.
Figure 11:
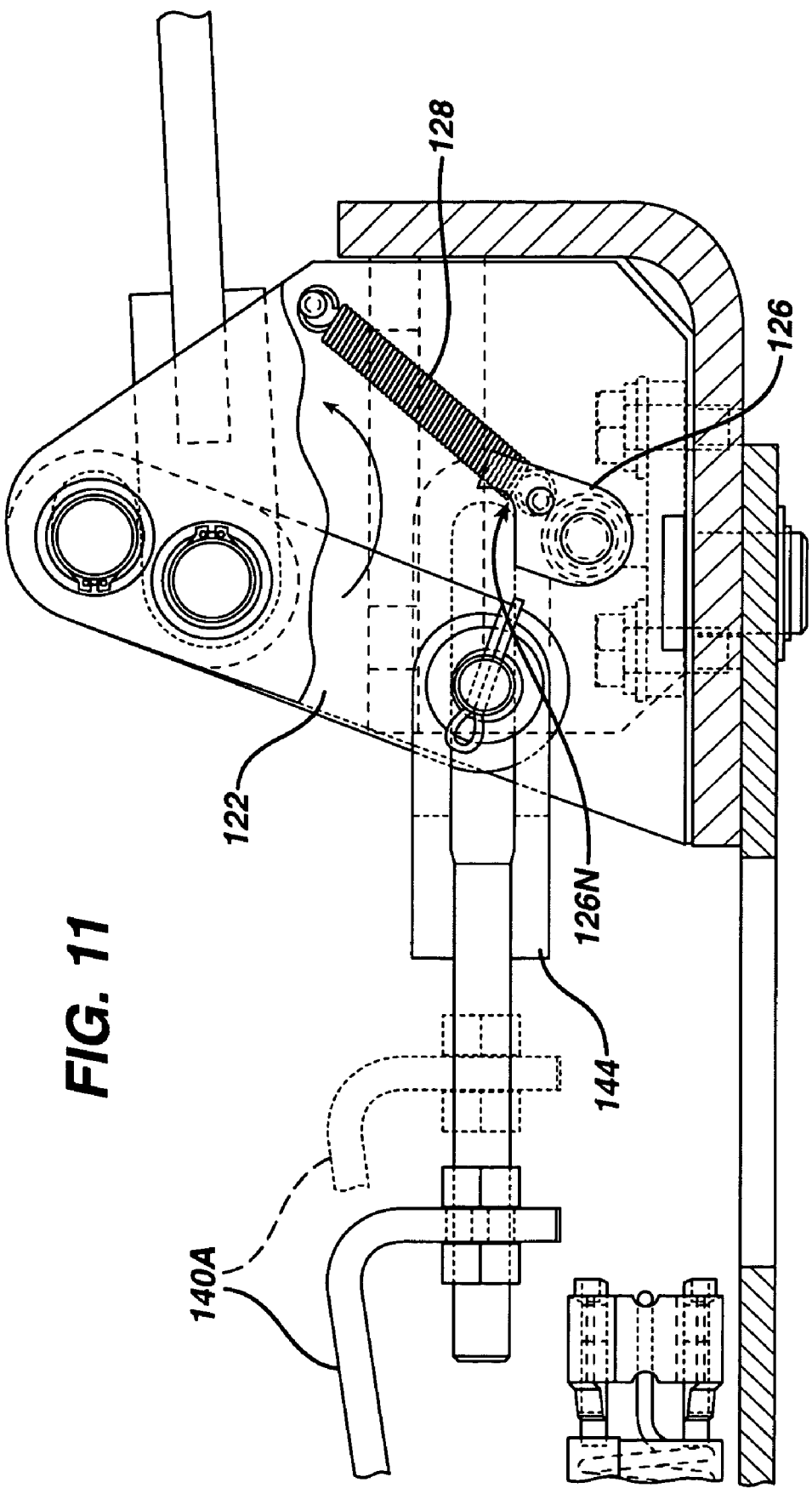
FIGS. 11-13 illustrate the pivoting latch mechanism with the pallet clamping device of FIGS. 9 and 10 for illustration of operation of the pivoting latch of FIG. 10.
Figure 12:
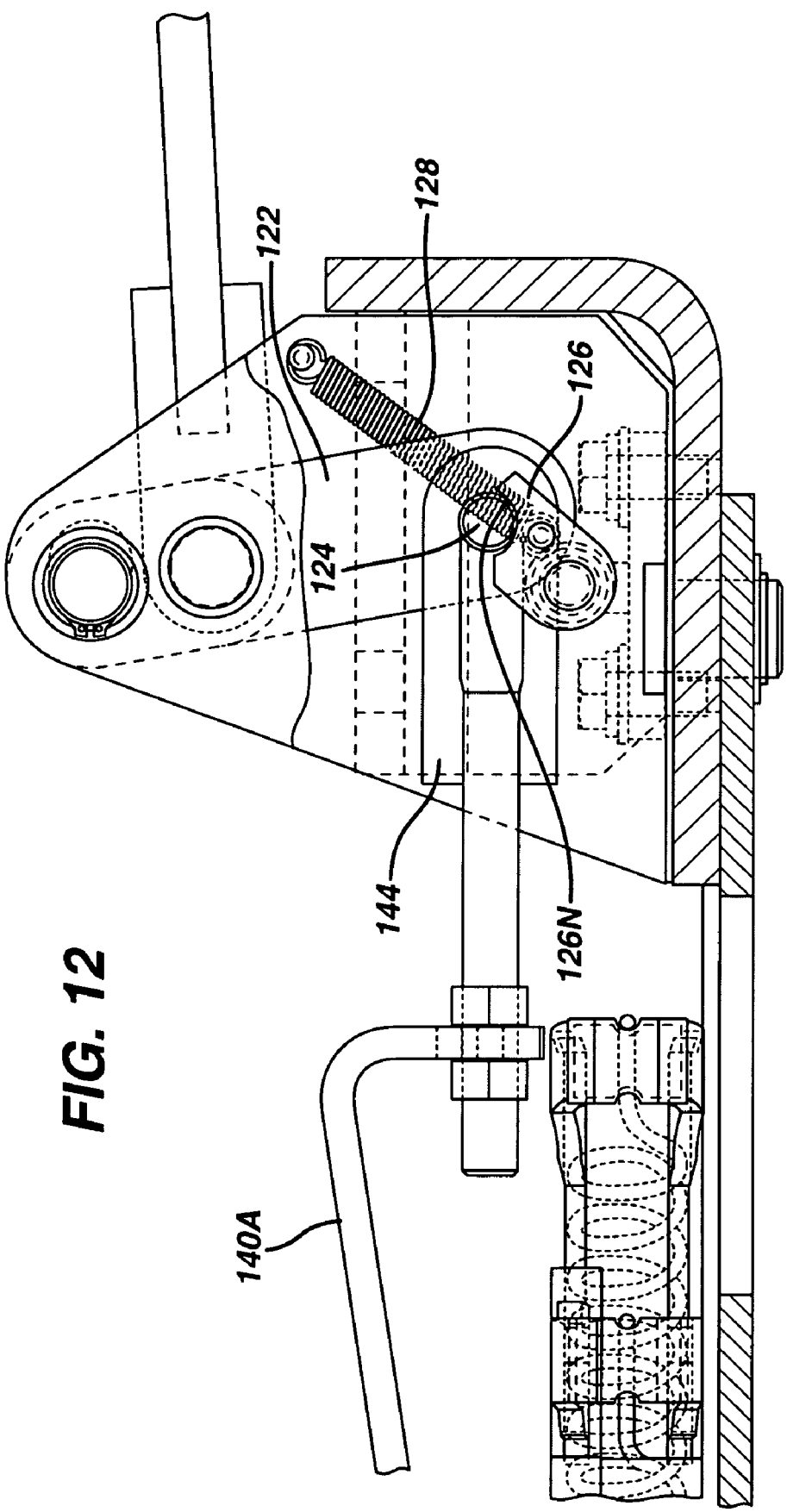
Figure 13:
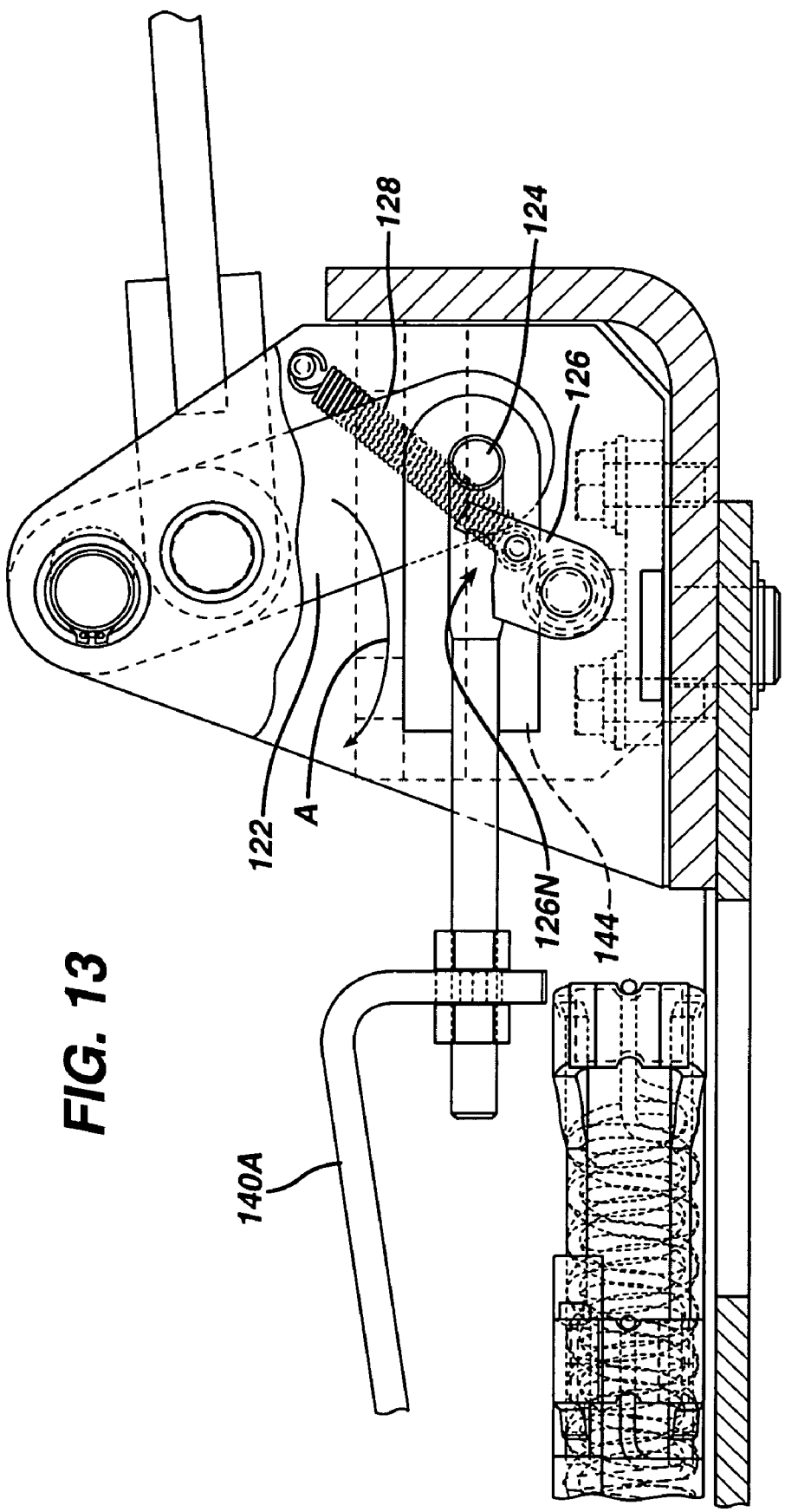
Figure 14:
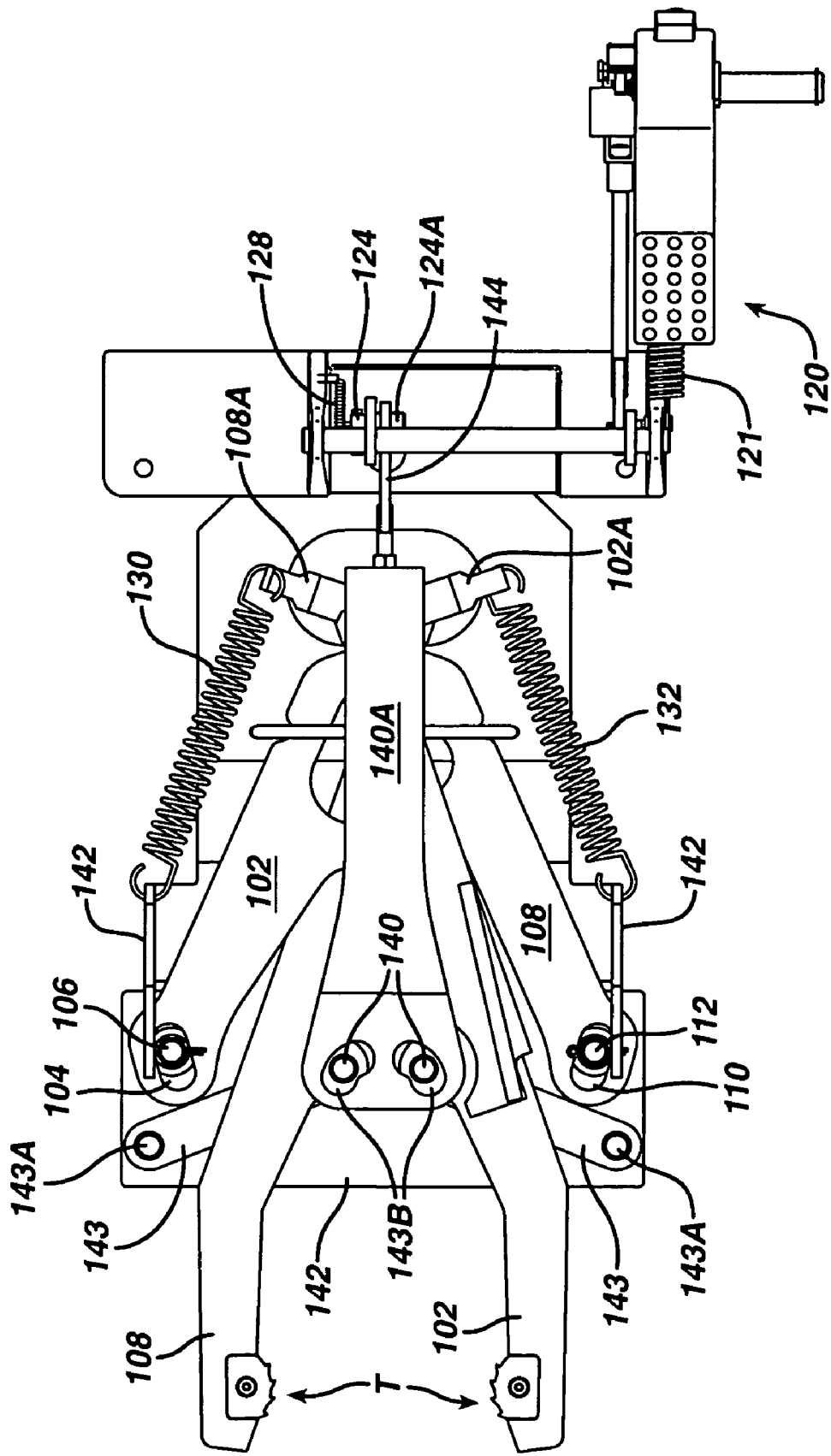
FIG. 14 is a top plan view of the pallet clamping device of FIGS. 5 and 6 showing the jaws in the latched open position.
Figure 15:
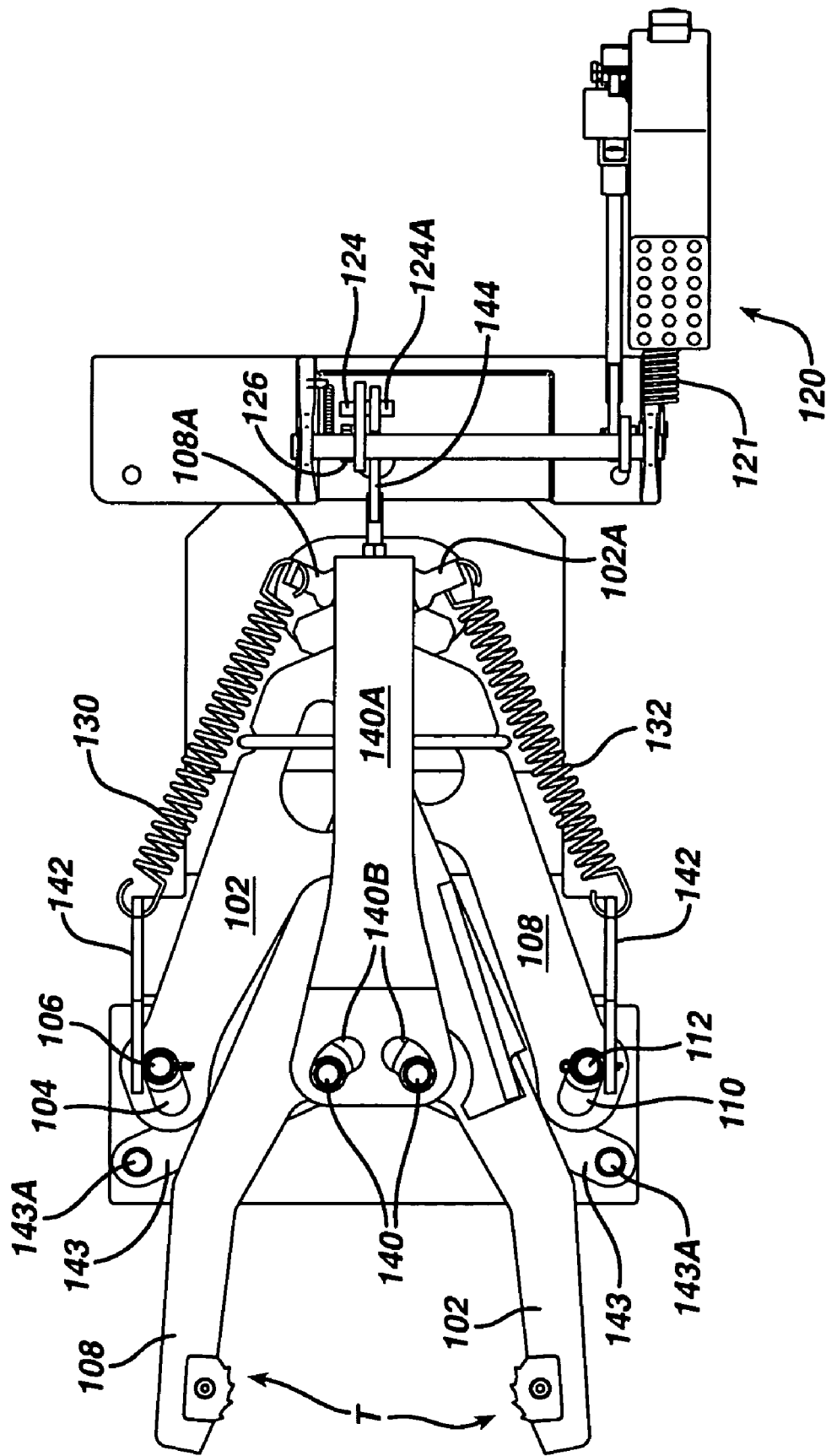
FIG. 15 is a top plan view of the pallet clamping device of FIGS. 5 and 6 showing the jaws in their full open position for receiving maximum width pallet stringers and for releasing the jaws from their latched open position.

The jaws 102, 108 can be opened to a latched open position wherein the jaws 102, 108 are separated by approximately 5.65 inches for a working embodiment of the pallet clamp 100, see FIGS. 12 and 14, by means of the interaction of a latch link 122 having a pin 124 extending therefrom that engages a pivoting latch 126 biased to a neutral position shown in FIGS. 10 and 11 by a spring 128. While the spring 128 is shown as an extension spring, other springs and resilient biasing arrangements can be used. For example, a torsion spring located around the shaft on which the pivoting latch 126 is mounted can be coupled between the pivoting latch 126 and the support frame 142. With the jaws 102, 108 latched open, an operator of a material handling vehicle including the illustrated pallet clamp 100 can approach a pallet having a stringer up to about 5.5 inches in width without having to hold the jaws 102, 108 open by keeping his/her foot on the foot pedal 120. In the latched open position, the pin 124 engages a circular portion of a notch 126N, see FIGS. 11-13, of the latch 126 and, due to the length of the latch link 122 and the orientation of the latch link 122 and the latch 126, as best shown in FIG. 12, the latch link 122 cannot pivot toward the forks 202 so that the jaws 102, 108 are held in the latched open position.

In the illustrated embodiment, the operator is made aware that the pallet clamp 100 is in the latched open position by the foot pedal 120 remaining in a partially depressed position corresponding to the latched open position of the jaws 102, 108. Of course, the pedal 120 could be returned to its fully up position and other indicators, such as visual or audible signaling devices, could be used to indicate the latched open position of the pallet clamp 100 to the operator. Thus, while not required, the described positioning of the foot pedal 120 may provide a simple, inexpensive and convenient way of communicating the operational status of the pallet clamp 100 to the operator. If desired, the shape of the latch 126 can also provide feedback through the foot pedal 120 so that the operator can feel when the foot pedal has been pushed down far enough so as to latch the jaws 102, 108 in the latched open position.

Figure 1:
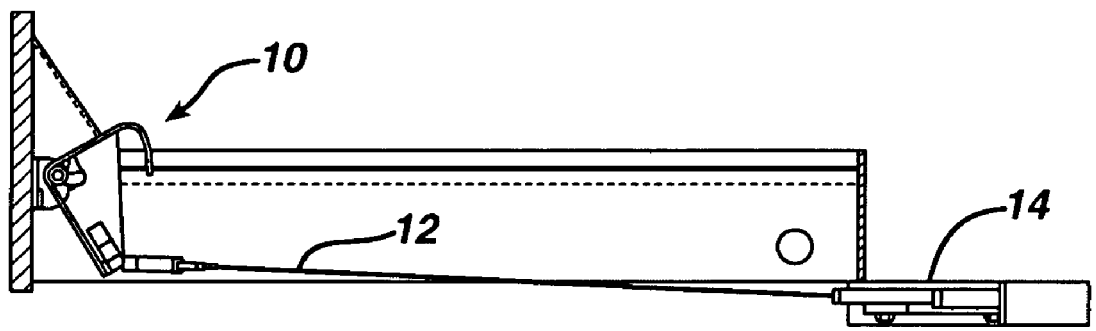
FIGS. 1-4 illustrate a passive locking pallet clamping device wherein double cam action forces, resulting from attempted movement of the pallet off the forks, are used to clamp pallet stringers.
Figure 2:
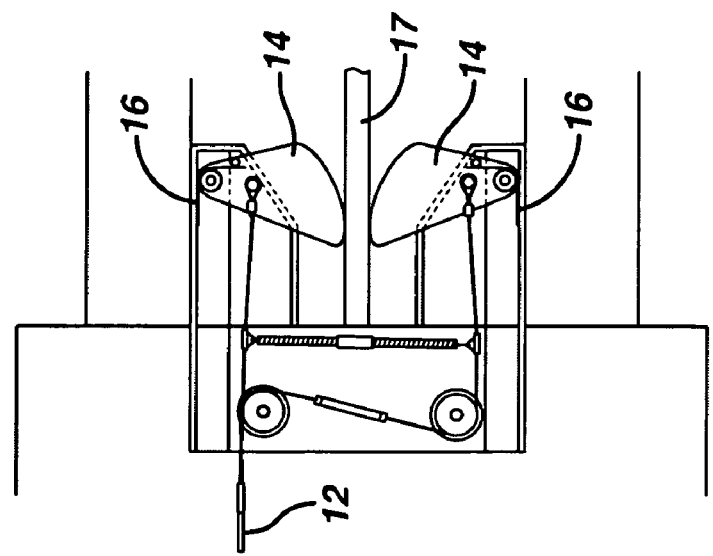
Figure 3:
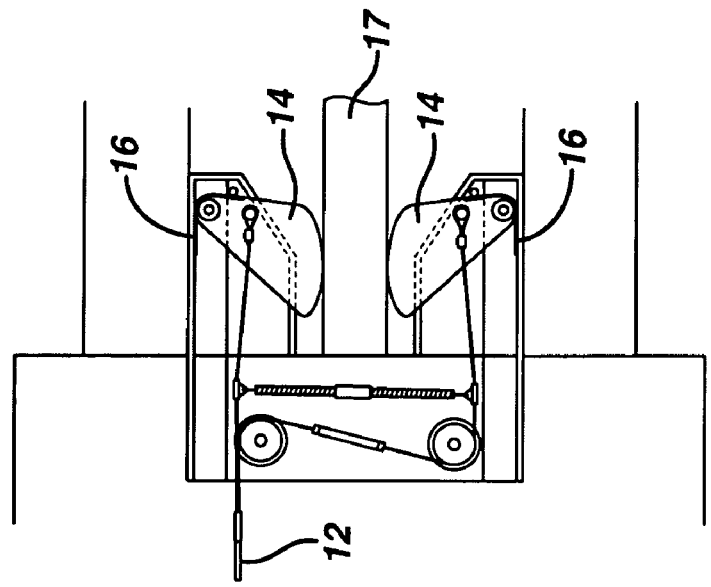
Figure 4:
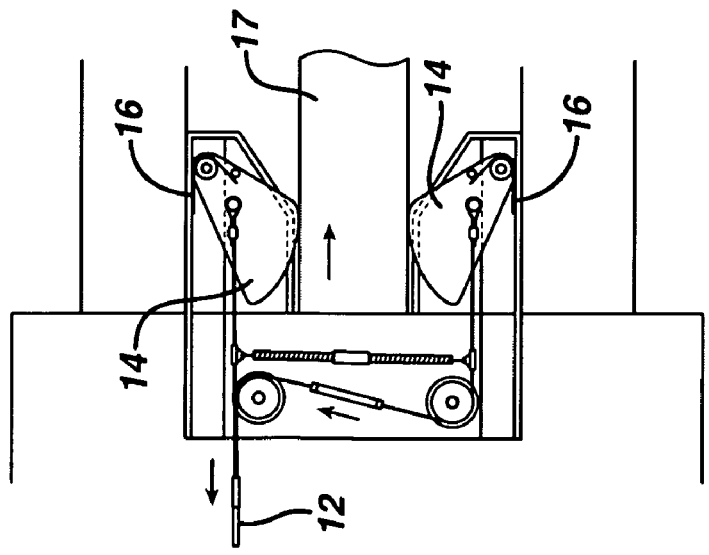
Figure 5:
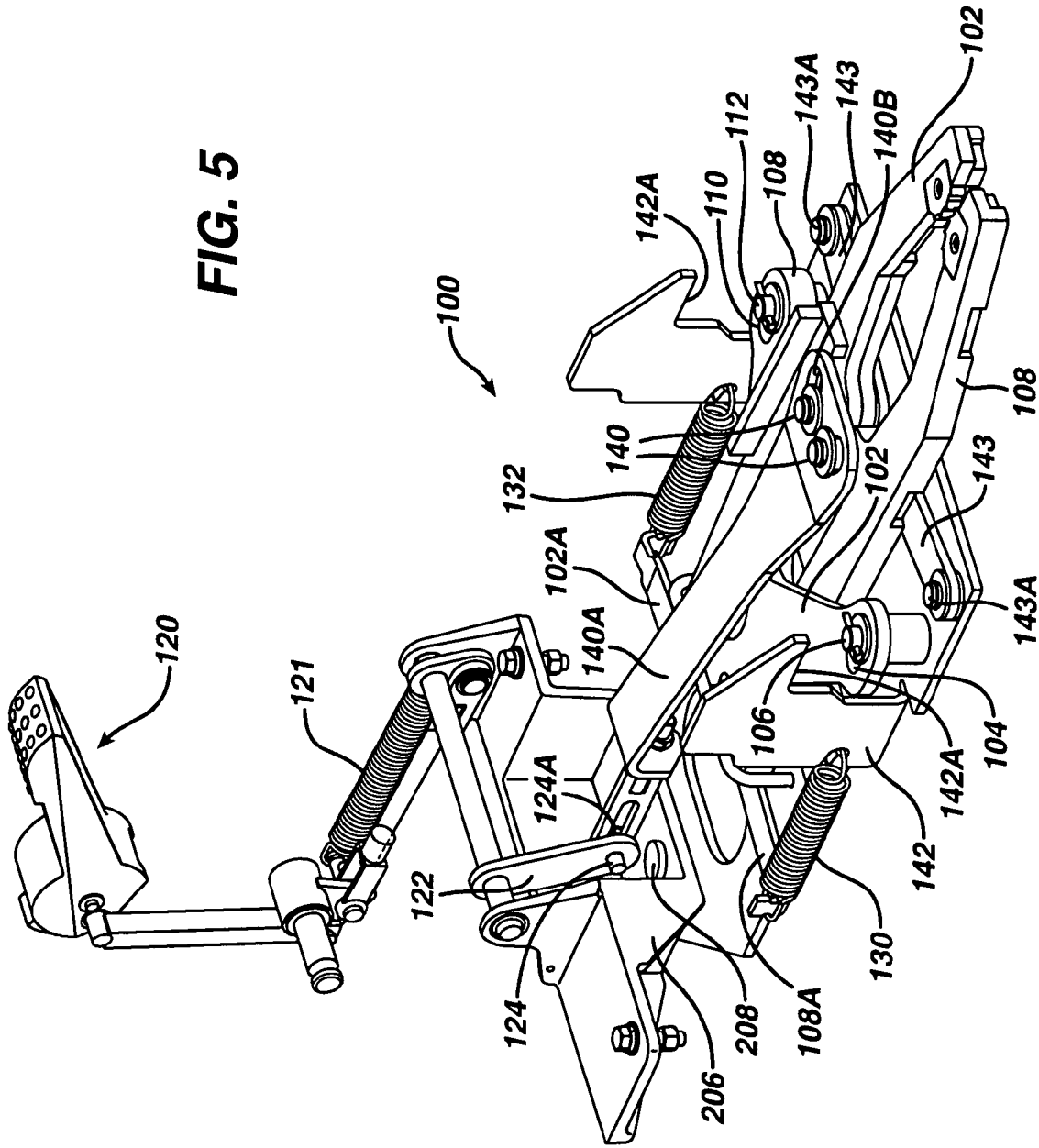
FIGS. 5 and 6 are isometric views of a pallet clamping device in accordance with the present invention with first and second jaws closed taken from opposite sides of the device.
Figure 6:
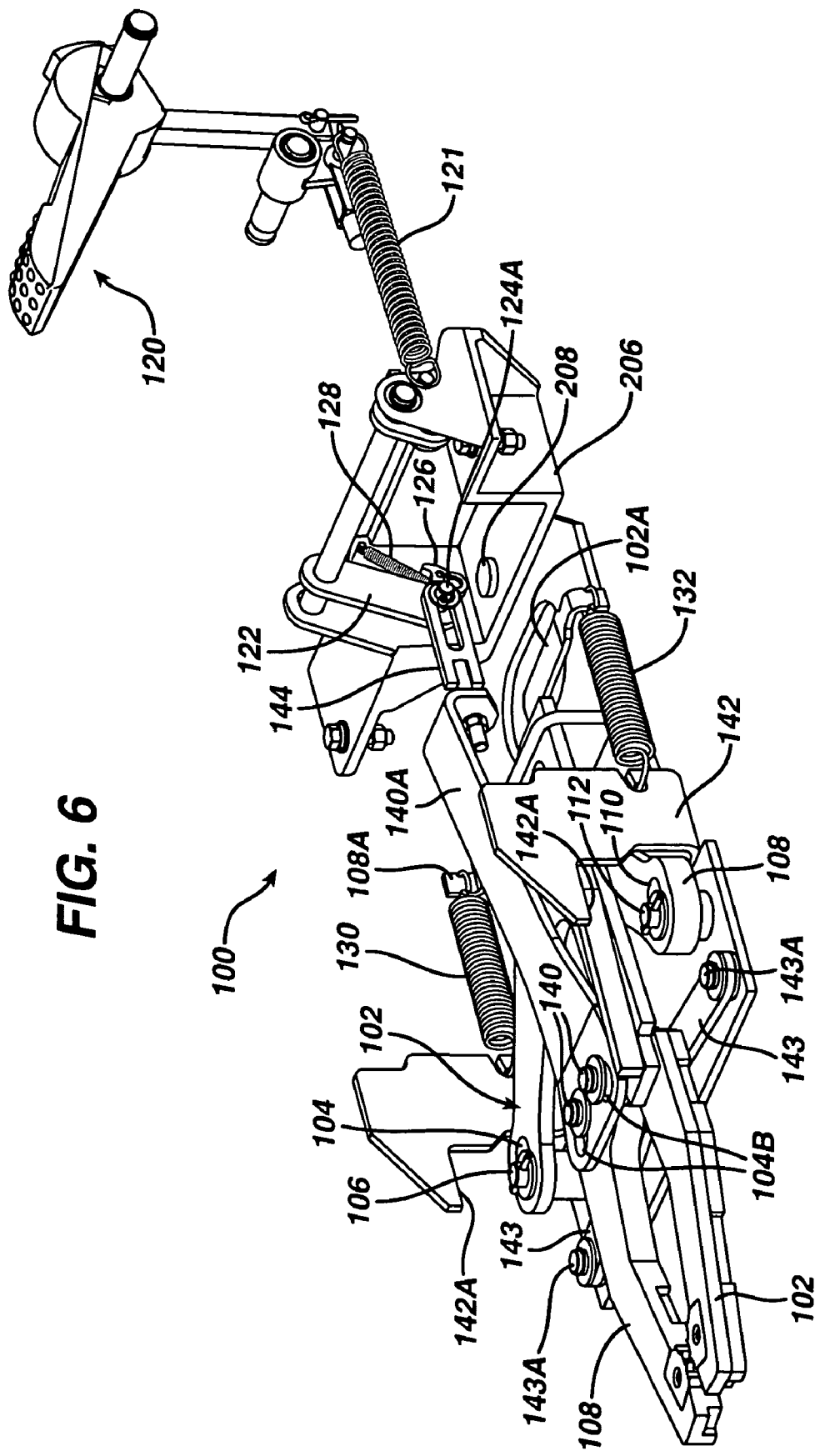

The foot pedal 120 is returned to its fully up position when the jaws 102, 108 are in their closed position or are clamping a pallet stringer. As shown in FIGS. 6 and 11, for example, a slotted link 144 enables the foot pedal 120 to return to its fully up position. The slotted link 144 receives an extension 124A of the pin 124 on the side of the latch link 122 opposite to the side from which the pin 124 extends so that it can slide along the extension 124A of the pin 124 when the jaws 102, 108 engage a pallet stringer without impacting the position of the foot pedal 120.

To release the jaws 102, 108 from the latched open position so that they move to their closed position or close onto a pallet stringer that has been positioned between the jaws 102, 108, the operator depresses the foot pedal 120 further, i.e., beyond the pedal position corresponding to the latched open position. This further depression of the foot pedal 120 moves the jaws 102, 108 so that they are opened toward a full opened position, approximately 7 inches for a working embodiment, and releases the jaws 102, 108 from the latched open position. Of course other full open widths can be used in the present invention. Since the jaws 102, 108 can be opened wider than their latched open position by using the foot pedal 120, the operator can also engage a pallet having a stringer with a width up to around 7 inches for a working embodiment by using the foot pedal 120 to fully open the jaws 102, 108.

As the foot pedal 120 is depressed beyond the latched open position, the pin 124 passes over the latch 126 so that the pin 124 is released from the notch 126N and the latch 126 moves forward to its spring biased position as shown in FIG. 13. Positions of the jaws 102, 108 between the position immediately after the pin 124 is released from the notch 126N and the fully open position of the jaws 102, 108 are referred to herein as an unlatched open position. When the foot pedal 120 is then released from the unlatched open position, the latch link 122 passes back to its position shown in FIG. 11 with the pin 124 passing over the latch 126 as the latch link 122 pivots as shown by an arrow A in FIG. 13. Jaw clamping springs 130, 132 extend between the support frame 142 and spring receiving extensions 102A and 108A of the jaws 102, 108 to force the jaws 102, 108 closed. The clamping force exerted by the jaw clamping springs 130, 132 is increased if a pallet attempts to move away from the pallet clamp 100 due to supplemental forces generated by the pivoting action of the jaws 102, 108 and the pivoting action of the pivot links 143. The operation of the pivot links 143 is best shown in FIG. 8A wherein only the jaw 108 is shown since the operation of the pivot link associated with the jaw 102 is substantially the same as should be apparent.

The pallet clamp 100 is mounted beneath a floor 204 of the truck 200 as shown in FIGS. 16, 17, 17A and 18. The rear of the support frame 142 is pivotally mounted to a clamp support 206 by an appropriate connector 208, such as a bolt/nut combination, while the front of the support frame 142 is supported by a pair of generally horizontal support surfaces 142A which engage a cross bar 210 extending between first and second clamp support members 212, 214. Alignment of the jaws 102, 108 with a pallet which is not perfectly centered on the forks of an associated material handling vehicle is facilitated by the pivoting movement of the support frame 142 about the connector 208. The flexibility of the jaws 102, 108, provided by the slot and pin connections to the jaws 102, 108, such as at 104, 106, 110, 112 and 140, also aids with the alignment of the jaws 102, 108 with a pallet that is not perfectly centered on the forks.

While operation of the pallet clamp 100 is apparent from the foregoing description, a brief description of its use will now be provided. For a material handling vehicle, such as the truck 200 of FIG. 16, including the pallet clamp 100 of the present application, an operator approaches a pallet to be moved using the vehicle so that forks of the vehicle are aligned to engage openings in the pallet, one on either side of the pallet stringer. Presuming that normal sized pallets, i.e., pallets having stringers which can be engaged with the jaws of the pallet clamp 100 in the latched open position, are being handled, the operator already has the jaws positioned in the latched open position, indicated by a partially depressed foot pedal or otherwise. If not, the operator depresses the foot pedal and places the jaws in the latched open position which can be felt through the foot pedal (or holds the foot pedal down). The pallet is then engaged and the operator depresses the foot pedal to a position beyond the latched position (or releases the foot pedal if not depressed to the latched position), not necessarily the fully depressed position, although depression of the pedal to the fully depressed position will ensure disengagement of the jaws from the latched position if they are latched open. The foot pedal is then released and the jaws close onto the pallet stringer. The pallet is then moved as required and, once repositioned where desired, the foot pedal is again depressed to release the pallet clamp 100 from the pallet.

To expedite pallet handling operations, the operator can place the pallet clamp 100 in its latched open position so that it is ready to clamp the next pallet to be moved. While the latched open position for the pallet clamp would normally be selected to accommodate most if not all pallets normally used at a facility utilizing a material handling vehicle including the pallet clamp, pallets having stringers with a width exceeding that corresponding to the latched open position of the jaws can still be accommodated. For pallets having oversized stringers, the operator can manually activate the pallet clamp 100 to its fully opened position by fully depressing the foot pedal and holding it down until a pallet is ready to be clamped. The foot pedal is then released to clamp the pallet stringer and the pallet clamped on the forks is then moved as before. When the pallet clamp is to be released, the foot pedal is once again fully depressed to fully open the jaws and release the pallet.

Having thus described the invention of the present application in detail and by reference to preferred embodiments thereof, it will be apparent that modifications and variations are possible without departing from the spirit of the invention.

What is claimed is:

1. A material handling vehicle comprising:
   a pair of forks to be inserted into a pallet having a center stringer;
   a hoisting device for raising said forks;
   a pallet clamp device mounted between said forks, said pallet clamp device including a pair of jaws having a closed position wherein said jaws are resiliently forced toward one another for engagement with the center stringer; and
   an operating device for moving said jaws from their closed position to a latched open position wherein said jaws are separated by a first distance and to an unlatched open position wherein said jaws are separated by a second distance greater than said first distance.

2. The material handling vehicle of claim 1, wherein attempted movement of a pallet off said forks causes said jaws to increase a gripping force of said jaws on the stringer.

3. The material handling vehicle of claim 2, including pivot pins mounting said jaws to a support frame for pivoting movement about said pivot pins as said jaws move between said closed and open positions.

4. The material handling vehicle of claim 3, wherein each jaw includes a gripping surface for engaging the stringer, said gripping surface for each jaw being located on a side of the stringer opposite from a respective pivot pin.

5. The material handling vehicle of claim 4, including a pivot link extending between each of said jaws and said support frame.

6. The material handling vehicle of claim 1, including a pivot link extending between each of said jaws and a support frame.

7. The material handling vehicle of claim 6, including pivot pins mounting said jaws to said support frame for pivoting movement about said pivot pins as said jaws move between said closed and open positions.

8. The material handling vehicle of claim 7, wherein said jaws are further mounted for sliding movement about said pivot pins.

9. The material handling vehicle of claim 6, wherein each pivot link is connected to a respective jaw by a coupling, and said operating device includes a linkage connected to said jaws at said coupling.

10. The material handling vehicle of claim 9, wherein said couplings connect said jaws to said linkage of said operating device for pivoting and sliding movement about said couplings.

11. The material handling vehicle of claim 1, wherein said jaws are mounted to a support frame and said support frame is pivotally mounted to a clamp support by a connector, said support frame being pivotally movable about said connector to enable said jaws to align with the stringer.

12. The material handling vehicle of claim 1, wherein said operating device includes a foot pedal movable between a fully depressed position, corresponding to said unlatched open position of said jaws, and a fully up position, corresponding to said closed position of said jaws, and including a predetermined partially depressed position, corresponding to said latched open position.

13. A material handling vehicle comprising:
a pair of forks to be inserted into a pallet having a center stringer;
a hoisting device for raising said forks;
a pallet clamp device mounted between said forks, said pallet clamp device including a pair of jaws having an open position, and having a closed position wherein said jaws are resiliently forced toward one another for engagement with the center stringer;
pivot pins mounting said jaws for pivoting and sliding movement about said pins as said jaws move between said closed and open positions for receiving the center; and
each said jaw including a gripping end and an opposite spring receiving end, said spring receiving ends each connected to a spring for biasing said jaws toward said closed position. and each of said pivot pins being engaged with a jaw portion located intermediate said gripping end and said spring receiving end.

14. The material handling vehicle according to claim 13, wherein each of said pivot pins are engaged with a laterally extending jaw portion on said respective jaws.

15. The material handling vehicle according to claim 14, including an operating device for moving said jaws between said closed and open positions and attached to said jaws at couplings spaced from said respective pivot pins.

16. The material handling vehicle according to claim 15, wherein said couplings are located intermediate said gripping and spring receiving ends, each said coupling being connected to a pivot link extending between each jaw and a support frame.

17. The material handling vehicle according to claim 16, wherein said pivot links are pivotally movable with pivoting movement of said jaws about said pivot pins.

18. The material handling vehicle of claim 16, wherein said support frame is pivotally supported to a clamp support by a connector, said support frame being pivotally movable about said connector to enable said jaws to align with the stringer.

19. The material handling vehicle according to claim 15, wherein the distance between said couplings and respective pivot pins of each jaw changes during pivoting movement of said jaws.

20. The material handling vehicle according to claim 15, wherein said couplings connect said jaws to said linkage of said operating device for pivoting and sliding movement about said couplings.

21. The material handling vehicle according to claim 13, including an operating device for moving said jaws between said closed and open positions wherein said operating device includes a latch for holding said jaws in a latched open position wherein said jaws are separated by a first distance.

22. The material handling vehicle according to claim 21, wherein said operating device is operable to move said jaws to an unlatched open position wherein said jaws are separated by a second distance greater than said first distance.

23. The material handling vehicle according to claim 22, wherein said operating device comprises a foot pedal, and said latch defines a predetermined partially depressed position for said foot pedal between a fully depressed position and a fully up position.

24. The material handling vehicle according to claim 23, wherein said foot pedal is releasable from said partially depressed position to said fully up position to move said jaws to said closed position engaged with the stringer.

* * * * *

UNITED STATES PATENT AND TRADEMARK OFFICE
CERTIFICATE OF CORRECTION

PATENT NO. : 7,544,037 B2
APPLICATION NO. : 11/485207
DATED : June 9, 2009
INVENTOR(S) : Haverfield et al.

It is certified that error appears in the above-identified patent and that said Letters Patent is hereby corrected as shown below:

Col. 8, line 3, "positions for receiving the center; and" should read --positions for receiving the center stringer; and--

Col. 8, line 8, "closed position. and each" should read --closed position, and each--

Signed and Sealed this

Twenty-second Day of December, 2009

David J. Kappos
*Director of the United States Patent and Trademark Office*